United States Patent Office 3,745,154
Patented July 10, 1973

3,745,154
PROCESS FOR THE POLYMERIZATION OR CO-POLYMERIZATION OF ETHYLENE AND CATALYST COMPOSITIONS THEREFOR
Norio Kashiwa, Iwakuni, Japan, assignor to Mitsui Petrochemical Industries, Ltd., Tokyo, Japan
No Drawing. Filed Aug. 10, 1971, Ser. No. 170,632
Claims priority, application Japan, Aug. 11, 1970, 45/69,686
Int. Cl. C08f 1/56, 3/06
U.S. Cl. 260—88.2 R
9 Claims

ABSTRACT OF THE DISCLOSURE

A process for the polymerization of ethylene or copolymerization of ethylene with another olefin in the presence of a specifically defined catalyst, as well as such catalyst per se, the catalyst comprising (A) a carrier-supported transition metal compound catalyst component, the catalyst component being obtained by
  (a) adding to a hydrocarbon solvent a finely divided solid inorganic compound carrier of magnesium or calcium and 0.05–10 millimols per gram of the inorganic compound of an organoaluminum compound, the inorganic compound carrier being insoluble in the hydrocarbon solvent,
  (b) adding to the resulting mixture a halide of vanadium and a halide of titanium, the halide of titanium being added in an amount of not more than 5 mols per mol of the halide of vanadium, the sum total number of mols of vanadium and titanium being in the range of 0.001–1 mol per mol of the organic groups of the aluminum compound of (a), above, and
  (c) reacting the so-formed liquid system containing finely divided solid inorganic compound carrier until substantially no free titanium and vanadium compounds are detected in the liquid phase of the system; and
(B) an organoaluminum compound catalyst component.

This invention relates to an improved process for polymerizing or copolymerizing ethylene and also an improved catalyst composition for use in such process. More particularly, the invention relates to an improved catalyst the polymer yield of which relative to the transition metal is exceedingly high under polymerization conditions which are suitable for melt polymerizing ethylene at an elevated temperature and wherein the control of the molecular weight of the resulting polymer is readily accomplished by means of hydrogen and, in addition, which makes it possible to adjust the molecular weight distribution of the polymer within a suitable range, as desired, depending upon its intended use; and also to improvements in the process for polymerizing or copolymerizing ethylene using the foregoing catalyst.

In recent years numerous proposals have been made regarding improved processes for polymerizing ethylene in which as the Ziegler catalyst therefor a transition metal component consisting of a halide of a transition metal supported on a carrier is used. Since these transition metal catalyst components supported on a carrier are efficiently well dispersed thereon, there are advantages such that the polymerization activity per unit quantity of transition metal is very high and, in most cases, there is no need for the operation of removing the catalyst after the polymerization reaction. However, when these catalyst systems are used, a disadvantage tends to occur that the molecular weight distribution of the resulting polymer becomes extremely narrow, especially when the polymerization reaction has been carried out at a temperature above 100° C. While this narrowness of the molecular weight distribution is desirable in such restricted areas of use of polyethylene as injection molding, in the various other areas of use such as in the case of use for extrusion molding and blow molding, serious disadvantages are involved. That is, in the case of polyethylene molecular weight distribution of which is extremely narrow, shaped articles of poor appearance having roughness such as shark skin, flow wark and pits tend to be produced. In addition, a rise in the extrusion pressure at the time of the molding occurs, with the consequence that disastrous effects are had on the extrusion molding operation making for instability of the molding operation and worsening of the moldability of the polymer as a result of the rise in the extrusion pressure. The result is that the merchandise value of the resulting product suffers greatly. While it was possible to expand the molecular weight distribution to a certain extent by a choice of the polymerization temperature and cocatalyst even when the previously proposed carrier supported catalyst components were used, it was not possible to expand the distribution to an extent making it satisfactory for practical purposes.

U.S. Pat. 3,166,542 discloses a previous proposal which utilizes a Ziegler catalyst composition consisting of a carrier supported transition metal compound catalyst component and an organoaluminum compound catalyst component.

In this proposal the utilization of a finely divided inorganic solid having an average particle diameter of less than about 1 micron, preferably less than about 0.1 micron, is recommended. Examples of such inorganic solids, include oxides such as alumina, titania, zirconia, silica, thoria and magnesia, silicates such as chrysotile, actinolite and crocidolite, and aluminates such as corundum and bauxite.

In this proposal no specific example is disclosed of using a magnesium compound such as magnesia as the carrier and supporting thereon a halide of vanadium. When, in accordance with this proposal, titanium tetrachloride is supported on magnesium oxide and a catalyst consisting of this in combination with an organoaluminum compound is used and ethylene is polymerized therewith, the molecular weight distribution of the resulting polyethylene is also narrow. Moreover, since the yield of polyethylene per unit quantity of titanium is extremely low, the discoloration of the polyethylene is pronounced. Further, when this catalyst system is used for the liquid phase polymerization of ethylene at elevated temperatures, not only is the decline in the polymerization activity marked but also unless the amount of hydrogen added for adjusting the molecular weight is used in a large quantity, the molecular weight cannot be reduced.

In this proposal, even though an organoaluminum compound is added to magnesium oxide and the reaction product obtained by the further addition of a halide of titanium alone is used in combination with an organoaluminum compound, the improvements of the present invention cannot be achieved in this case also.

As another proposal, the proposal of British patent specification No. 916,132 is known. In this proposal a system consisting of an organometallic compound supported on an oxide carrier such as silica or alumina and in combination a transition metal compound is used for polymerizing the olefins. However, in this method, since the organometallic compound used is only that which has been supported on the carrier, the amount is extremely small, and therefore the polymerization activity is poor.

As a still another proposal, that disclosed in British patent specification No. 927,969 is known. In this method the transition metal compound is supported on the carrier through the intermediary of an oganometallic compound.

However, this carrier-supported catalyst was prepared for use in the vapor phase polymerization by means of a fluidized bed, and therefore its polymerization activity is low. The carrier material disclosed in this proposal is a water-soluble carrier such as sodium chloride and calcium chloride so as to simpify the separation of the carrier by washing the resulting polyethylene with water. If the method of this proposal is employed, a large amount of chlorine will remain in the polyethylene product, with the consequence that this causes corrosion of the processing equipment during the molding operation as well as deterioration of the properties of the product. That is to say, this known method concerns a catalyst for use in the polymerization of ethylene wherein it is strictly presupposed that an after treatment for the removal of the catalyst will be carried out. Thus, this method possesses disadvantages from the operations standpoint.

As a result of research with a view to overcoming the disadvantages involved in the Ziegler catalyst compositions which utilize a carrier and the method of polymerizing or copolymerizing ethylene using these catalyst compositions, it has been found that a catalyst consisting of (A) a carrier supported transition metal compound catalyst component obtained by
    (a) adding to a hydrocarbon solvent a finely divided solid organic compound carrier of magnesium or calcium, which is insoluble in the solvent, and 0.05–10 millimoles per gram of the inorganic compound of an organo-aluminum compound,
    (b) adding to the resulting mixture a halide of vanadium and a halide of titanium, the latter being added in an amount of not more than 5 mols per each mol of the former, the sum-total number of mols of vanadium and titanium being in the range of 0.001–1 mol per each mol of the organic groups of the aluminum compound of (a), above, and
    (c) reacting the so formed liquid system containing finely divided solid inorganic compound carrier until substantially no free titanium and vanadium compounds are detected in the liquid phase of the system, and
(B) an organoaluminum compound catalyst component demonstrated excellent results in overcoming the disadvantages of these hitherto proposed catalyst compositions and that by the utilization of such a catalyst the disadvantages of the hitherto proposed method of polymerizing ethylene could also be solved.

Accordingly, an object of the present invention is to provide an improved catalyst composition which can overcome the disadvantages of the hitherto proposed carrier supported Ziegler catalysts and also provide a process for polymerizing or copolymerizing ethylene with this improved catalyst.

Other objects and advantages of the invention will become apparent from the following description.

As the hydrocarbon solvent-insoluble finely divided solid carrier material of an inorganic compound of magnesium or calcium, which is used in the invention as the carrier, preferably used are such, for example, as magnesium oxide, magnesium hydroxide, magnesium carbonate, magnesium sulfate, double oxides of magnesium containing a small quantity of a metal component selected from the group consisting of Al, Si, Fe and Ni, calcium oxide, calcium hydroxide and calcium sulfate. Carriers containing chlorine such as magnesium chloride, calcium chloride and magnesium oxychloride are not desirable, since they remain in the resulting polyethylene and cause rusting of the molding equipment during the molding operation. Calcium carbonate is also not desirable, for the polymerization activity of a catalyst with this as the carrier is low.

As a carrier which provides a catalyst excelling in polymerization activity and by the use of which the adjustment of the molecular weight distribuiton is readily accomplished as well as color of the resulting polymer is good, the aforementioned compounds of magnesium and calcium give especially good results.

The compounds of magnesium or calcium to be used as the carrier are preferably used in a stage in which they have been dried and finely subdivided in advance. The average particle diameter of the carrier is preferably 0.1 to 100 microns, and especially 2–100 microns, and the specific surface area of the carrier should be of the order of 10 to 500 square meters per gram.

The carrier supported transition metal compound catalyst component (A) is prepared in the following manner. First, the carrier material is suspended in a suitable hydrocarbon solvent. The use of a saturated hydrocarbon for this solvent is to be preferred, and one which can be used as the polymerization solvent during the polymerization reaction is desirable. For example, mention can be made of hexane, heptane, kerosene and cyclohexane. The use of the solvent in an amount on the order of 0.5 to 50 ml. per gram of the carrier will suffice. The suspension is preferably agitated under an atmosphere of an inert gas, such as nitrogen, for a while to remove oxygen and water therefrom as much as possible.

Next, an organoaluminum compound is added to this suspension and adsorbed to the carrier. The organoaluminum compound is used in an amount of 0.05 to 10 millimoles per gram of the carrier inorganic compound. In order to ensure that the organoaluminum compound is throughly adsorbed to the carrier, the suspension is preferably stirred for 5 minutes to one hour at 0° to 100° C. under an atmosphere of an inert gas.

As the organoaluminum compound which is adsorbed to the carrier, preferred are, for example, the following compounds: i.e. trialkylaluminums such as triethylaluminum and tributylaluminum; dialkylaluminum halides such as diethylaluminum chloride, diethylaluminum bromide and dibutylaluminum chloride; dialkylaluminum alkoxides such as diethylaluminum ethoxide and diethylaluminum phenoxide; and alkylaluminum alkoxy halides such as ethylaluminum ethoxy chloride and alkylaluminum sesquihalides such as ethylaluminum sesquichloride.

The amount of organoaluminum compound adsorbed to the carrier need not necessarily be the total amount of the organoaluminum compound added to system, but some of it may remain free. However, it is not desirable for the free organoaluminum compound to be present in a substantial amount, for this tends to reduce the polymerization activity. The adsorption to the carrier of the organoaluminum compound can be confirmed by a chemical analysis of the aluminum present in the solvent portion. This is followed by the addition of halides of vanadium and titanium to the mixed system in which the organoaluminum compound adsorbed carrier is suspended. The halides of vanadium and titanium are added in a total amount of 0.001 to 1 mol per each mol of the organic group of the organoaluminum compound, the halide of titanium being added in an amount of not more than 5 mols per mole of the halide of vanadium. And the halides of vanadium and titanium are preferably reacted until their total amount is deposited on the carrier through the intermediary of the organoaluminum compound. The reaction is preferably carried out for 5 minutes to one hour at 0° to 100° C. The completion of the reaction can be confirmed by the fact that the presence of vanadium and titanium can no longer be substantially detected in the liquid phase, i.e. the supernatant, of the reaction system.

The presence of free vanadium and titanium compounds in the medium not only reduces the activity for polymerizing ethylene, but causes discoloration of the ethylene polymer as well. The free vanadium or titanium compounds can be completely separated from the suspension by filtrably separating the carrier-supported transition metal compound catalyst component therefrom. However, separation by filtration need not necessarily be preformed. On arrival at the point where substantially no free titanium and vanadium compounds are detectable in the liquid phase of the reaction system, the economical practice is to add the organoaluminum compound catalyst component (B) and to proceed with the polymerization reaction.

As the halides of vanadium and titanium, useable are such, for example, as vanadium oxytrichloride, vanadium tetrachloride, titanium tetrachloride, titanium tetrabromide, titanium alkoxytrichloride, and titanium dialkoxy dichlorides such as titanium ethoxydichloride and titanium dibutoxydichloride.

What must be especially watched in the preparation of the invention catalyst is the amount of organoaluminum compound used relative to the amount of carrier and the amount of the halides of vanadium and titanium relative to the number of organic groups of the organoaluminum compound. When the amount of organoaluminum compound used departs from the range of 0.05–10 millimols per gram of the carrier and is a value which is too small, a catalyst of high activity cannot be obtained. On the other hand, when the amount is too great, the activity is also low and, in addition, the polyethylene formed is one molecular weight distribution of which is narrow. Further, when the amount of the halides of vanadium and titanium per mol of the organic groups of the organoaluminum compound used departs from the range of 0.001–1 mol, when calculated as the total number of mols of vanadium and titanium, and is too small, a catalyst of low activity is produced. On the contrary, when the amount is too great, a large amount of free vanadium and titanium compounds becomes leftover in the solvent portion and thus result in the formation of a catalyst of low activity.

The molecular weight distribution of the polymer can be adjusted to come within the desired range without impairment of the polymerization activity by a suitable adjustment of the relative amounts in which the vanadium compound and the titanium compound are used. That is, the molecular weight distribution of the polymer is broadened by an increase in the amount of the titanium relative to the vanadium.

However, if the amount of titanium is increased too greatly, there is a tendency toward an excessive decline of the polymerization activity as well as a narrowing of the molecular weight distribution of the polymer. Therefore, it is necessary that the vanadium and titanium compounds be used in the proportions hereinbefore indicated, i.e., not more than 5 mols of the halide of titanium per each mol of the halide of vanadium. In the case where the amount of titanium is very small or the titanium compound is not conjointly used, a polymer having a narrow molecular weight distribution can be obtained without impairment of the polymerization activity. The resulting polymer is used in those areas where the requirement is for a narrow molecular weight distribution such as in the case of injection molding. However, in those cases where a polymer with a wide molecular weight distribution is required, such as in the case of blow molding, the use of a halide of titanium in an amount of 0.1–5 mols per mol of the halide of vanadium is preferred, the use of the former in this range being a special feature of the present invention.

When a titanium compound is used alone, the activity of polymerizing ethylene is low, and there is the disadvantage especially in the case of a polymerization reaction at elevated temperatures that the amount of hydrogen used becomes great when it is desired to bring the molecular weight down to a level that is desired. The molecular weight distribution of the resulting polyethylene is also narrow.

The carrier supported transition metal compound catalyst component (A) prepared in the manner described hereinbefore can be stored in its as-obtained dispersion state and can be transferred, as required, to a polymerization reactor where it is combined with the organoaluminum compound catalyst component (B) and used for the polymerization of ethylene. Usually, the concentration of the as-prepared dispersion is too high for use in the polymerization of ethylene. Accordingly, it is diluted with a suitable solvent, for example, the same solvent as that used previously in preparing the catalyst component (A), before using it for the polymerization reaction. The concentration of the catalyst during the polymerization reaction should be such that the sum-total of titanium and vanadium in the catalyst component (A) is in the range of 0.005 to 0.5 millimol per liter of the solvent. The polymerization catalyst is formed by adding anew an organoaluminum compound catalyst component (B) to this carrier supported catalyst.

As the organoaluminum compound catalyst component (B), a trialkylaluminum, a dialkylaluminum halide and a dialkylaluminum alkoxide are preferably used, the amount of use being preferably 0.1 to 2 millimols per liter of the polymerization solvent.

As previously noted, the invention catalyst system is especially suitable for the polymerization of ethylene at elevated temperatures. As compared with the other Ziegler catalysts whose decline in polymerization activity becomes excessive as the polymerization temperature becomes high, the decline in activity of the invention catalyst system is relatively small. Even at relatively high temperatures of 120–180° C., preferably 130–180° C., an activity of sufficiently high level such as not conceivable by conventional standards is demonstrated by this invention catalyst.

This invention catalyst is not only effective in the homopolymerization of ethylene but can also be used as a copolymerization catalyst for copolymerizing ethylene with the other olefins, for example, alpha-olefins, such as propylene, 1-butene, 4-methyl-1-pentene and styrene, and diolefins such as butadiene and isoprene.

While the amount of hydrogen that is copresent in the polymerization reaction according to this invention varies depending upon the desired molecular weight of the intended ethylene polymer, the polymerization temperature and pressure, to obtain an ethylene polymer having a molecular weight on the order of 30,000 with a polymerization temperature of 150° C. and a polymerization pressure of 40 kg./cm.$^2$-g., the ratio of the hydrogen in the vapor phase exclusive of the solvent vapor is usually on the order of 4 mol percent, and on the order of 2 mol percent when a molecular weight of 80,000 is desired. In the case of polymerizing ethylene with an alpha-olefin or a diolefin, it is usual for the amount of hydrogen used to be changed somewhat. The amount of hydrogen to be used can be readily determined experimentally.

In the past, it has been said that the contamination of the resulting polyethylene is great when a vanadium compound has been used as the transition metal compound component in the Ziegler catalyst. However, there is no cause for such concern as long as use is made of a catalyst prepared in accordance with the present invention. Polyethylene of pleasing appearance comparable to that obtained by using the usual titanium compound as the transition metal compound catalyst component and followed moreover by a residual catalyst removal treatment can be obtained.

When ethylene is polymerized with the catalyst system of this invention, the polymerization activity is very high and the polymer formation amounts to as much as 5000 to 10,000 grams per millimol of the transition metal. Therefore, since the amount of catalyst residue remaining in the ethylene polymer is exceedingly small even though a catalyst removal treatment is not performed, there is no adverse effect from the standpoint of its practical use.

EXAMPLE 1

Commercially available magnesia (No. 40, product of Kyowa Chemical Company, Japan, weight average particle diameter 3 microns, iodine adsorption 39 mg./g.-magnesia) was dried for 24 hours at 80° C. in a vacuum dryer. The subsequent operations were all carried out in a stream of nitrogen. One kg. of the foregoing dried magnesia was suspended in 10 liters of kerosene, followed by addition thereto of 1 mol of triethylaluminum and stirring for 30 minutes at room temperature. Next, 105 millimols of vanadium tetrachloride were added, stirring of the mixture was carried out for 30 minutes, and then after adding 105 millimols of titanium tetrachloride, the stirring was continued for 4 hours at room temperature. As a result, the total number of mols of vanadium and titanium per mol of the ethyl groups of the triethylaluminum became 70 millimols. The system was then allowed to stand to settle the solids. When a part of the supernatant was taken and quantitatively analyzed, for titanium and vanadium, neither could be detected.

A 200-liter autoclave was charged with 100 liters of kerosene, 1 millimol of triethylaluminum per liter of kerosene, and 0.01 millimol calculated as the transition metals (sum of titanium and vanadium) of the carrier supported catalyst prepared as above described. Hydrogen was then introduced to a pressure of 1 kg./cm.$^2$, after which ethylene was introduced until a total pressure of 40 kg./cm.$^2$ was built up. The polymerization reaction was then carried out for 1 hour at 140° C. As a result 80 kg. of polyethylene having a melt index of 0.4 were obtained. This corresponds to 8000 grams when calculated as polymer yield per millimol of titanium and vanadium. The $\overline{M}w/\overline{M}n$ of this polyethylene ($\overline{M}$ is the weight average molecular weight and $\overline{M}n$ is the number average molecular weight; $\overline{M}w/\overline{M}n$ must be at least 12 for blow molding use) was 18. When this polyethylene was blow-molded to a 400-cc. tubular bottle, the extrusion pressure of the resin was low and a blow-molded bottle excelling in its appearance was obtained.

Control I

A 2-liter autoclave was charged with 1 liter of kerosene, 1 millimol of triethylaluminum, and 0.005 millimol of vanadium tetrachloride and 0.005 millimol of titanium tetrachloride. After raising the temperature of the system to 140° C. and introducing hydrogen to a pressure of 1 kg./cm.$^2$, the polymerization of ethylene was carried out for one hour at 140° C. while maintaining the total pressure of the system at 40 kg./cm.$^2$, whereupon was obtained polyethylene of a melt index of 0.1 and $\overline{M}w/\overline{M}n = 10$ in an amount of only 9.5 grams.

In this case the polyethylene yield per millimol of titanium and vanadium was 950 grams.

Control II

Ten millimols of triethylaluminum, 1 millimol of vanadium tetrachloride and 1 millimol of titanium tetrachloride were added concurrently to 100 cc. of kerosene, followed by stirring for 5 hours at room temperature. Using 1 liter of kerosene, 1 millimol of triethylaluminum and the catalyst prepared as hereinabove described in an amount such that the sum of titanium and vanadium was 0.01 millimol, the polymerization of ethylene was carried out as in Control I. As a result 15 grams of polyethylene having a melt index of 0.18 were obtained. This corresponds to a polyethylene yield per millimol of titanium and vanadium of 1500 grams.

Control III

One kg. of the same magnesia as used in Example 1 was suspended in 10 liter of kerosene, following which 1 mol of triethylaluminum was added thereto and the stirring of the mixture was carried out for 30 minutes. After adding 100 millimols of titanium tetrachloride to the resulting mixture, the stirring was continued until no titanium could be detected in the solvent portion.

Using kerosene and 1 millimol of triethylaluminum and 0.01 millimol of the foregoing carrier supported catalyst per liter of kerosene, the polymerization of ethylene was carried out as in Example 1, with the result that 930 grams of polyethylene having a melt index of 0.01 and a $\overline{M}w/\overline{M}n=10$ was obtained. The polyethylene yield per millimol of titanium was 930 grams. Due to its color, it was necessary to submit this polyethylene to a catalyst residue removal treatment.

Control IV

Commercially available sodium chloride, calcium chloride and calcium carbonate were dried for 24 hours at 100° C. under vacuum, and carrier supported catalysts were prepared as in Example 1, except that sodium chloride, calcium chloride and calcium carbonate were used respectively instead of the magnesia of Example 1. The so prepared catalysts were used and ethylene was polymerized as in Example 1 with the results shown in Table 1. In Table 1 the results obtained in Example 1 are also presented by way of comparison.

TABLE 1

| Carrier | Polyethylene | |
|---|---|---|
| | Melt index | Yield, g./mmol (Ti+V) |
| NaCl | 0.05 | 450 |
| CaCl$_2$ | 0.10 | 880 |
| CaCO$_3$ | 0.04 | 220 |
| MgO (Example 1) | 0.4 | 8,000 |

Control V

One kg. of the magnesia used in Example 1 was suspended in 10 liters of kerosene, after which 100 millimols of vanadium tetrachloride and 100 millimols of titanium tetrachloride were added thereto, followed by reacting this suspension for 3 hours at 110° C. The so prepared carrier supported catalyst component was used at such a rate that the sum of vanadium and titanium was 0.01 millimol per liter of kerosene, along with 1 millimol of triethylaluminum per liter of kerosene to carry out the polymerization of ethylene as in Example 1. As a result, only 880 grams of polyethylene having a melt index of 2 the color of which were very poor were obtained. The polyethylene yield per millimol of titanium and vanadium was only 880 grams.

Control VI

The magnesia used in Example 1 was suspended in kerosene at the rate of 1 gram of the former to 10 cc. of the latter, after which 1 millimol of triethylaluminum per gram of magnesia was added to the suspension, which was then stirred for 5 hours at room temperature. A 2-liter autoclave was then charged with 1 liter of kerosene, 1 millimol, calculated as aluminum, of the foregoing catalyst, 0.005 millimol of titanium tetrachloride and 0.005 millimol of vanadium tetrachloride. After raising the temperature of the system to 140° C. and introducing hydrogen to a pressure of 1 kg./cm.$^2$, the polymerization of ethylene was carried out for one hour at 140° C. by continuously feeding ethylene so as to maintain a total pressure of 40 kg./cm.$^2$. As a result polyethylene of a melt index of 0.01 was obtained in an amount of only 1.5 grams. This corresponds to only 150 grams per mol of the sum of titanium and vanadium.

EXAMPLE 2

Magnesia having a surface area of 80 square meters per gram, an ignition loss of 3.45% and a weight average particle diameter of 10 microns was dried for 48 hours at 110° C. under vacuum. The so dried magnesia was suspended in kerosene using 10 cc. of the latter per gram of the former. This was followed by stirring the suspension for one hour at room temperature after adding triethylaluminum in amounts which were varied. Next, an equimolar liquid mixture of titanium tetrachloride and vanadium tetrachloride was added to the suspension in such an amount that the molar sum of titanium and vanadium was 0.08 times the number of mols of the alkyl groups of the triethylaluminum, followed by stirring the mixture for 5 hours at room temperature. A 2-liter autoclave was then charged with 1 liter of kerosene, 1 millimol of triethylaluminum and 0.01 millimol, calculated as total mols of titanium and vanadium, of the above described catalyst, after which hydrogen was introduced to a pressure of 2 kg./cm.$^2$. The polymerization of ethylene was then carried out for 1 hour at 140° C. by continuously adding ethylene while maintaining the total pressure at 40 kg./cm.$^2$. The results obtained are summarized in Table 2.

EXAMPLE 4

The magnesia used in Example 1 was suspended in hexane at the rate of 20 cc. of the latter per gram of the former, after which 1 millimol per gram of the magnesia of triethylaluminum was added to the suspension, which was then stirred for one hour at room temperature. Next, titanium tetrachloride and vanadium tetrachloride were mixed in varying molar ratios, after which the so mixed titanium and vanadium compounds were added to the foregoing suspension in an amount such that the total number of mols of titanium and vanadium would be 0.1 times molar quantity of ethyl groups of the added triethylaluminum. The suspension was then stirred for 4 hours at room temperature. Using 0.01 millimol of the so obtained catalyst and 1 millimol of triethylaluminum, the polymerization of ethylene was carried out as in Example 2 with the results shown in Table 4.

TABLE 4

| Experiment | Carrier | Alkylaluminum per gram carrier (mmol) | Ti/V | Ti+V alkyl group | Polyethylene | | |
|---|---|---|---|---|---|---|---|
| | | | | | Melt index | Yield, g./mmol (Ti+V) | $\overline{Mw}/\overline{Mn}$ |
| Control | MgO | Et$_3$Al (1) | 7 | 0.10 | 0.05 | 890 | 12 |
| Example | MgO | Et$_3$Al (1) | 5 | 0.10 | 0.25 | 3,900 | 20 |
| Do | MgO | Et$_3$Al (1) | 0.1 | 0.10 | 1.21 | 10,000 | 12 |
| Do | MgO | Et$_3$Al (1) | 0.01 | 0.10 | 2.54 | 12,300 | 10 |

TABLE 2

| Experiment | Carrier | Alkylaluminum per gram carrier (mmol) | Ti/V | Ti+V alkyl group | Polyethylene | | |
|---|---|---|---|---|---|---|---|
| | | | | | Melt index | Yield, g./mmol (Ti+V) | $\overline{Mw}/\overline{Mn}$ |
| Control | MgO | Et$_3$Al (0.01) | 1 | 0.08 | 0.08 | 990 | 12 |
| Example | MgO | Et$_3$Al (0.05) | 1 | 0.08 | 0.12 | 3,300 | 17 |
| Do | MgO | Et$_3$Al (0.5) | 1 | 0.08 | 0.51 | 9,400 | 19 |
| Do | MgO | Et$_3$Al (5) | 1 | 0.08 | 0.44 | 8,600 | 18 |
| Do | MgO | Et$_3$Al (10) | 1 | 0.08 | 0.61 | 7,800 | 15 |
| Control | MgO | Et$_3$Al (50) | 1 | 0.08 | 0.11 | 1,300 | 12 |

EXAMPLE 3

Commercially available calcium oxide (ignition loss 1.8%, average particle diameter 2 microns) was dried for 5 hours at 300° C. This calcium oxide was suspended in kerosene at the rate of 10 cc. of the latter per gram of the former, following which 1 millimol per gram of the calcium oxide of diethylaluminum chloride was added to the suspension, the suspension being then stirred for one hour at room temperature. Vanadium tetrachloride and titanium tetrachloride were mixed so that their molar ratio Ti/V would be 0.3, and the catalysts were prepared varying the ratio of the total number of mols of titanium and vanadium to the ethyl groups of the diethylaluminum chloride. Using the so prepared catalysts, the polymerization of ethylene was carried out as in Example 2 with the results shown in Table 3.

EXAMPLE 5

Commercially available anhydrous magnesium sulfate, anhydrous magnesium carbonate, magnesium hydroxide, anhydrous calcium sulfate and calcium hydroxide were each dried for 36 hours at 120° C. under vacuum. The classes and amounts of the alkylaluminus compound to be added to the carrier material, the classes and relative molar ratios of the titanium and vanadium compounds, and the sum total of the titanium and vanadium relative to the number of alkyl groups of the alkylaluminum that was added were varied in synthesizing the catalysts as in Example 2. Ethylene was then polymerized as in Example 2, using 1 liter of kerosene, 1 millimol of triisobutylaluminum and 0.01 millimol of the hereinabove described carrier supported catalyst component. The results obtained are shown in Table 5.

TABLE 3

| Experiment | Carrier | Alkylaluminum per gram of carrier (mmol) | Ti/V | Ti+V alkyl group | Polyethylene | | |
|---|---|---|---|---|---|---|---|
| | | | | | Melt index | Yield, g./mmol (Ti+V) | $\overline{Mw}/\overline{Mn}$ |
| Control | CaO | Et$_2$AlCl (1) | 0.3 | 0.0001 | 0.04 | 330 | 8 |
| Example | CaO | Et$_2$AlCl (1) | 0.3 | 0.001 | 0.10 | 3,200 | 15 |
| Do | CaO | Et$_2$AlCl (1) | 0.3 | 0.01 | 0.30 | 5,100 | 17 |
| Do | CaO | Et$_2$AlCl (1) | 0.3 | 0.10 | 0.40 | 7,900 | 18 |
| Do | CaO | Et$_2$AlCl (1) | 0.3 | 1 | 0.38 | 4,700 | 15 |
| Control | CaO | Et$_2$AlCl (1) | 0.3 | 3 | 0.06 | 970 | 11 |

TABLE 5

| Carrier | Alkylaluminum compound per gram of carrier (mmol) | Ti/V (mol ratio) | Ti+V alkyl group | Polyethylene | | |
|---|---|---|---|---|---|---|
| | | | | Melt index | Yield, g./mmol (Ti+V) | Mw/Mn |
| MgSO₄ | EtAlCl₂ (1) | TiCl₄/VOCl₃=0.5 | 0.2 | 2.3 | 9,100 | 16 |
| MgCO₃ | Et₃Al (1) | Ti(OEt)Cl₃/VCl₄=1 | 0.4 | 0.21 | 2,800 | 18 |
| Mg(OH)₂ | Et₃Al (3) | Ti(O-nBu)₂Cl₂/VCl₄=0.3 | 0.02 | 0.10 | 7,800 | 15 |
| CaSO₄ | Et₂AlCl (1) | TiBr₄/VCl₄=1 | 0.1 | 0.25 | 6,600 | 17 |
| Ca(OH)₂ | Et₃Al (5) | Ti(O-nBu)Cl₃/VOCl₃=1 | 0.01 | 0.21 | 4,200 | 18 |

EXAMPLE AND CONTROL VII

The carrier-supported catalyst prepared in Example 1 was used, and ethylene was polymerized with similar catalyst concentration and polymerization conditions as in Example 1 using various alkylaluminums instead of triethylaluminum used in Example 1. The results obtained are shown in Table 6. As a control, the results obtained by polymerizing ethylene in a similar manner using the carrier-supported catalyst prepared in Control III with ethylaluminum dichloride are also presented in Table 6.

TABLE 6

| Experiment | Alkylaluminum compound used | Polyethylene | | |
|---|---|---|---|---|
| | | Melt index | Yield, g./mmol (Ti+V) | Mw/Mn |
| Example | Et₂AlCl | 0.10 | 3,300 | 17 |
| Do | EtAlCl₂ | 0.08 | 1,500 | 19 |
| Do | Et₁.₅AlCl₁.₅ | 0.10 | 1,700 | 17 |
| Control | EtAlCl₂ | 0.04 | 2.0 | 13 |

EXAMPLE 7

A 2-liter autoclave was charged with 1 liter of kerosene, 1 millimol of triethylaluminum and 0.01 millimol of the carrier-supported catalyst component prepared in Example 1. The temperature of the system was then raised to 140° C., hydrogen was introduced to a pressure of 0.1 kg./cm.², and thereafter a gas mixture of ethylene and propylene containing 15 mol percent of the latter was continuously fed for one hour at this temperature while ensuring that the total pressure was maintained at a constant value of 40 kg./cm.². As a result 76 grams of polyethylene having a density of 0.945 and a melt index of 1.5 were obtained.

EXAMPLE 8

A 2-liter autoclave was charged with 1 liter of hexane, 1 millimol of triisobutylaluminum and 0.01 millimol of the carrier-supported catalyst component prepared in Example 1. The temperature of the system was then raised to 140° C., hydrogen was introduced to a pressure of 0.1 kg./cm.², and thereafter a gas mixture of ethylene and 1-butene containing 10 mol percent of the latter was continuously fed for one hour at this temperature while ensuring that the total pressure was maintained at a constant value of 40 kg./cm.². As a result 74 grams of polyethylene having a density of 0.942 and a melt index of 1.8 were obtained.

I claim:

1. In a process for polymerizing ethylene or copolymerizing ethylene with another olefin in a hydrocarbon solvent in the presence of a Ziegler catalyst composition comprising a carrier-supported transition metal compound catalyst component and an organoaluminum compound catalyst component, and in the copresence of hydrogen, the improvement wherein said polymerization or copolymerization reaction is carried out in the presence of a catalyst comprising (A) a carrier-supported transition metal compound catalyst component, said catalyst component being obtained by (a) adding to a hydrocarbon solvent a finely divided solid inorganic compound carrier of magnesium or calcium selected from magnesium oxide; magnesium hydroxide; magnesium carbonate; magnesium sulfate; double oxides of magnesium containing a minor amount of a metallic component selected from the group consisting of Al, Si, Fe and Ni; calcium oxide; calcium hydroxide and calcium sulfate, and 0.05-10 millimols per gram of said inorganic compound of an organoaluminum compound, said inorganic compound carrier being insoluble in said hydrocarbon solvent, (b) adding to the resulting mixture a halide of vanadium and a halide of titanium, said halide of titanium being added in an amount of 0.01 to 5 mols per mol of said halide of vanadium, the sum total number of mols of vanadium and titanium being in the range of 0.001-1 mol per mol of the organic groups of said aluminum compound of (a), above, and (c) reacting the so formed liquid system containing finely divided solid inorganic compound carrier until substantially no free titanium and vanadium compounds are detected in the liquid phase of said system; and (B) an organoaluminum compound catalyst component.

2. The process of claim 1 wherein said carrier has an average particle diameter of 0.1-100 microns and a specific surface area of 10-500 square meter per gram.

3. The process of claim 1 wherein said organoaluminum compound of (a) is a member selected from the group consisting of trialkylaluminums, dialkylaluminum halides, dialkylaluminum alkoxides, alkylaluminum alkoxy halides and alkylaluminum sesquihalides.

4. The process of claim 1 wherein said organoaluminum compound catalyst component (B) is a member selected from the group consisting of trialkylaluminums, dialkylaluminum halides and dialkylaluminum alkoxides.

5. The process of claim 1 wherein said halide of vanadium or titanium is a member selected from the group consisting of vanadium oxytrichloride, vanadium tetrachloride, titanium tetrachloride, titanium tetrabromide, titanium alkoxy trichloride and titanium dialkoxy dichlorides.

6. The process of claim 1 wherein said carrier supported transition metal compound catalyst component (A) is a component prepared in an atmosphere of an inert gas.

7. The process of claim 1 wherein said polymerization or copolymerization reaction is carried out at a catalyst concentration in which the sum-total number of mols of vanadium and titanium of said carrier supported transition metal compound catalyst component (A) is 0.005-0.5 millimol per liter of the hydrocarbon solvent and the concentration of said organoaluminum compound catalyst component (B) is 0.1-2 millimols per liter of the hydrocarbon solvent.

8. The process of claim 1 wherein said halide of vanadium of (b) is a member selected from the group consisting of vanadium oxychloride and vanadium tetrachloride.

9. A catalyst composition for use in the polymerization of ethylene or copolymerization of ethylene and another olefin, said composition comprising
  (A) a carrier-supported transition metal compound catalyst component, said catalyst component being obtained by
    (a) adding to a hydrocarbon solvent a finely divided solid inorganic compound carrier of magnesium or calcium selected from magnesium oxide; magnesium hydroxide; magnesium carbonate; magnesium sulfate; double oxides of magnesium containing a minor amount of a metallic component selected from the group consisting of Al, Si, Fe and Ni, calcium oxide; calcium hydroxide and calcium sulfate, and 0.05–10 millimols per gram of said inorganic compound of an organoaluminum compound, said inorganic compound carrier being insoluble in said hydrocarbon solvent,
    (b) adding to the resulting mixture a halide of vanadium and a halide of titanium, said halide of titanium being added in an amount of 0.01 to 5 mols per mol of said halide of vanadium, the sum total number of mols of vanadium and titanium being in the range of 0.001–1 mol per mol of the organic groups of said aluminum compound of (a), above, and
    (c) reacting the so formed liquid system containing finely divided solid inorganic compound carrier until substantially no free titanium and vanadium compounds are detected in the liquid phase of said system; and
  (B) an organoalminum compound catalyst component.

References Cited

UNITED STATES PATENTS

| 3,479,326 | 11/1969 | Delbonille et al. | 260—94.9 D A |
| 3,644,318 | 2/1972 | Diedrich et al. | 260—94.4 D A |
| 3,308,112 | 3/1967 | Ludlum | 260—94.9 E |
| 3,553,287 | 1/1971 | Delbonille et al. | 260—94.9 D A |
| 3,553,181 | 1/1971 | Delbonille et al. | 260—94.9 D A |
| 3,594,330 | 7/1971 | Delbonille et al. | 260—94.9 D A |

FOREIGN PATENTS

| 2,000,834 | 9/1970 | Germany | 260—94.9 D A |
| 744,522 | 7/1970 | Belgium. | |
| 2,029,992 | 12/1970 | Germany. | |

JAMES A. SEIDLECK, Primary Examiner

E. J. SMITH, Assistant Examiner

U.S. Cl. X.R.

252—429 C; 260—85.3, 94.9 D A